(12) United States Patent
Hansen

(10) Patent No.: US 7,178,149 B2
(45) Date of Patent: Feb. 13, 2007

(54) XML SCRIPTING OF SOAP COMMANDS

(75) Inventor: James R. Hansen, Franklin, MA (US)

(73) Assignee: Axeda Corporation, Foxboro, MA (US)

(*) Notice: Subject to any disclaimer, the term of this patent is extended or adjusted under 35 U.S.C. 154(b) by 643 days.

(21) Appl. No.: 10/123,960

(22) Filed: Apr. 17, 2002

(65) Prior Publication Data

US 2003/0200349 A1 Oct. 23, 2003

(51) Int. Cl.
G06F 13/00 (2006.01)

(52) U.S. Cl. .................................... 719/310
(58) Field of Classification Search ............. 719/310
See application file for complete search history.

(56) References Cited

U.S. PATENT DOCUMENTS

| | | | |
|---|---|---|---|
| 4,497,037 A | 1/1985 | Kato et al. | |
| 4,583,834 A | 4/1986 | Seko et al. | |
| 4,853,946 A | 8/1989 | Elliott et al. | |
| 5,077,582 A | 12/1991 | Kravette et al. | |
| 5,212,645 A | 5/1993 | Wildes et al. | |
| 5,297,034 A | 3/1994 | Weinstein | |
| 5,307,263 A | 4/1994 | Brown | |
| 5,469,353 A | 11/1995 | Pinsky et al. | |
| 5,555,191 A | 9/1996 | Hripcsak | |
| 5,586,254 A | 12/1996 | Kondo et al. | |
| 5,603,323 A | 2/1997 | Pflugrath et al. | |
| 5,655,084 A | 8/1997 | Pinsky et al. | |
| 5,659,794 A | 8/1997 | Caldarale et al. | |
| 5,675,744 A | 10/1997 | Tsujii | |
| 5,715,393 A | 2/1998 | Naugle | |
| 5,715,823 A | 2/1998 | Wood et al. | |
| 5,732,212 A | 3/1998 | Perholtz et al. | |
| 5,736,965 A | 4/1998 | Mosebrook et al. | |
| 5,740,801 A | 4/1998 | Branson | |
| 5,745,268 A | 4/1998 | Eastvold et al. | |
| 5,748,907 A | 5/1998 | Crane | |
| 5,752,917 A | 5/1998 | Fuchs | |
| 5,761,529 A | 6/1998 | Raji et al. | |
| 5,768,516 A | 6/1998 | Sugishima | |
| 5,772,585 A | 6/1998 | Lavin et al. | |
| 5,774,052 A | 6/1998 | Hamm et al. | |
| 5,786,994 A | 7/1998 | Friz et al. | |
| 5,790,793 A | 8/1998 | Higley | |

(Continued)

FOREIGN PATENT DOCUMENTS

JP 06-062130 3/1994

(Continued)

OTHER PUBLICATIONS

Reuven M. Lerner, At the Forge Introducing SOAP, 2001.*

(Continued)

Primary Examiner—William Thomson
Assistant Examiner—LeChi Truong
(74) Attorney, Agent, or Firm—Fish & Richardson P.C.

(57) ABSTRACT

A computer-implemented method processes a simple object access protocol (SOAP) command. The method includes interpreting an XML script to perform a function contained in the XML script, the XML script containing the SOAP command, parsing the SOAP command from the XML script, and passing the SOAP command to a SOAP interpreter for execution.

31 Claims, 2 Drawing Sheets

U.S. PATENT DOCUMENTS

| | | | |
|---|---|---|---|
| 5,809,237 | A | 9/1998 | Watts et al. |
| 5,812,397 | A | 9/1998 | Pech et al. |
| 5,828,943 | A | 10/1998 | Brown |
| 5,845,230 | A | 12/1998 | Lamberson |
| 5,857,967 | A | 1/1999 | Frid et al. |
| 5,865,745 | A | 2/1999 | Schmitt et al. |
| 5,878,746 | A | 3/1999 | Lemelson et al. |
| 5,880,677 | A | 3/1999 | Lestician |
| 5,917,405 | A | 6/1999 | Joao |
| 5,935,060 | A | 8/1999 | Iliff |
| 5,968,116 | A | 10/1999 | Day et al. |
| 5,970,149 | A | 10/1999 | Johnson |
| 5,975,737 | A | 11/1999 | Crater et al. |
| 6,003,061 | A | 12/1999 | Jones et al. |
| 6,014,631 | A | 1/2000 | Teagarden et al. |
| 6,014,691 | A | 1/2000 | Brewer et al. |
| 6,022,315 | A | 2/2000 | Iliff |
| 6,023,223 | A | 2/2000 | Baxter, Jr. |
| 6,060,994 | A | 5/2000 | Chen |
| 6,061,603 | A | 5/2000 | Papadopoulos et al. |
| 6,098,116 | A | 8/2000 | Nixon et al. |
| 6,101,407 | A | 8/2000 | Groezinger |
| 6,115,489 | A | 9/2000 | Gupta et al. |
| 6,167,448 | A | 12/2000 | Hemphill et al. |
| 6,282,454 | B1 | 8/2001 | Papadopoulos et al. |
| 6,304,895 | B1 | 10/2001 | Schneider et al. |
| 6,317,783 | B1 | 11/2001 | Freishtat et al. |
| 6,317,848 | B1 | 11/2001 | Sorens et al. |
| 6,343,320 | B1 | 1/2002 | Fairchild et al. |
| 6,370,582 | B1 | 4/2002 | Lim et al. |
| 6,377,162 | B1 | 4/2002 | Delestienne et al. |
| 6,381,557 | B1 | 4/2002 | Babula et al. |
| 6,405,310 | B1 | 6/2002 | Simpson |
| 6,415,023 | B2 | 7/2002 | Iggulden |
| 6,430,711 | B1 | 8/2002 | Sekizawa |
| 6,437,692 | B1 | 8/2002 | Petite et al. |
| 6,449,633 | B1 | 9/2002 | Van et al. |
| 6,466,971 | B1 | 10/2002 | Humpleman et al. |
| 6,477,117 | B1 | 11/2002 | Narayanaswami et al. |
| 6,487,513 | B1 | 11/2002 | Eastvold et al. |
| 6,510,350 | B1 | 1/2003 | Steen et al. |
| 6,523,130 | B1 | 2/2003 | Hickman et al. |
| 6,529,848 | B2 | 3/2003 | Sone |
| 6,549,612 | B2 | 4/2003 | Gifford et al. |
| 6,560,656 | B1 | 5/2003 | O'Sullivan et al. |
| 6,581,092 | B1 | 6/2003 | Motoyama et al. |
| 6,598,011 | B1 | 7/2003 | Koritzinsky et al. |
| 6,651,110 | B1 | 11/2003 | Caspers et al. |
| 6,651,190 | B1 | 11/2003 | Worley et al. |
| 6,686,838 | B1 | 2/2004 | Rezvani et al. |
| 6,691,106 | B1 | 2/2004 | Sathyanarayan |
| 6,711,618 | B1 | 3/2004 | Danner et al. |
| 6,757,714 | B1 | 6/2004 | Hansen |
| 2002/0006790 | A1 | 1/2002 | Blumenstock et al. |
| 2002/0038320 | A1 | 3/2002 | Brook |
| 2002/0064138 | A1 | 5/2002 | Saito et al. |
| 2003/0014733 | A1* | 1/2003 | Ringseth et al. ............ 717/116 |
| 2003/0070006 | A1* | 4/2003 | Nadler et al. ............... 709/330 |
| 2003/0118353 | A1 | 6/2003 | Baller |

FOREIGN PATENT DOCUMENTS

| | | |
|---|---|---|
| JP | 06062130 | 3/1994 |
| JP | 07325513 | 12/1995 |
| JP | 09163008 | 6/1997 |
| JP | 10190922 | 7/1998 |
| JP | 10224372 | 8/1998 |
| JP | 10-295788 | 4/2000 |
| WO | WO98/20439 | 5/1998 |
| WO | WO98/33302 | 7/1998 |
| WO | WO98/38910 | 9/1998 |
| WO | WO98/41943 | 9/1998 |
| WO | WO99/21336 | 4/1999 |
| WO | WO99/57649 | 11/1999 |
| WO | WO 99/57837 | 11/1999 |
| WO | WO99/57838 | 11/1999 |
| WO | WO00/23894 | 4/2000 |
| WO | WO 02/10919 | 2/2002 |
| WO | WO02/21414 | 3/2002 |
| WO | WO02/25501 | 3/2002 |

OTHER PUBLICATIONS

Didier Martin, Professional XML, Jan. 2000.*

Lassman, M. et al., "Modern Nuclear Medical Diagnostics with Efficient Gamma Cameras," *Electromedica*, 66(2):43-51 (1998).

CORBA and XML Integration in Enterprise Systems—Ennis (2000); www.iona.com/info/techcenter/ecoop2000apr17.pdf.

Implementing Incremental Code Migration with XML, Emmerich, W. et al, IEEE, 4-11, Jun. 2000.

XML-based Data System for Earth Science Applications, Suresh, R et al.; IEEE 2000 Internation, vol. 3, pp. 242-328, Jul. 2000.

http://www.upnp.org/download.UPnPDA10_20000613.htm (52 pgs).

webmethods B2B Whitepaper; www.cs.wisc.edu/~vganti/papers/b2b_wpB2Bintegration.html.

virtual reality transfer protocol (vrtp); www.stl.nps.navy.mil/~brutzman/vrtp.

The Simple Times, vol. 7, No. 1, Mar. 1999; www.simple-times.org/pub/simple-times/issues/7-1.html.

Edward F. Steinfeld "Internet-appliance technology automates test equipment" EDN Magazine, pp. 157-169, Oct. 2000, www.edbmag.com.

Tom Williams "Java Goes To Work Controlling Networked Embedded Systems" Computer Design, Pennwell Publ. Littleton, MA, 35:9:36-37, Aug. 1996.

http://www.linuxjournal.com/article.php?sid=4195.

"RomWebClient Embedded HTTP client 1-61 Toolkit" ALLEGROSOFT, 'Online! Jul. 9, 2000 (2000-07-091, pp. 1-2, XPOO2201938 Retrieved from the Internet: <URL: http://web.archive. org/web/20000709204234/http://www.allegrosoft.com/romwebclient. html> retrieved on Jun. 12, 2002 the whole document.

Allegro Software product release 1-61 overview Greenhills Software Inc., 'Online! Jun. 10, 2002 (2002-06-1o), pp. 1-1, XPOO2201939 Retrieved from the Internet: URL: http://www.ghs.com/partners/allegro/>'retrieved on Jun. 10, 2002! the whole document.

Database WIP, Section EI, Week 200156, Abstract, Document No. XP002253876 (Korea Electronics & Telecom Res Inst.) Derwent Publications, Ltd., London, GB, Mar. 5, 2001.

Box, et al., Simple Object Acces Protocol (SOAP) 1.1, Document No. XP002250270, May 8, 2000.

Edward Steinfeld, "Making the Change", Document No. XP002201937, Apr. 2000, Circuit Cellar Online.

International Search Report—PCT/US03/11701 (dtd Oct. 13, 2004).

Lerner, R., "At the Forge: Introducing SOAP", Linux Journal, Mar. 2001 (#XP002292162).

SOAP Archives Online, "Multiple Method Calls in SOAP Packet"; URL: http://discuss.develop.com/archives/wa.exe?A2=ind9912&L=soap&T=O&F=&S=&P=25113>.

Mason, K., "XML Translation for block structured languages", IBM Corporation: Research Disclosure, Kenneth Mason Publications, 44176 (2001).

* cited by examiner

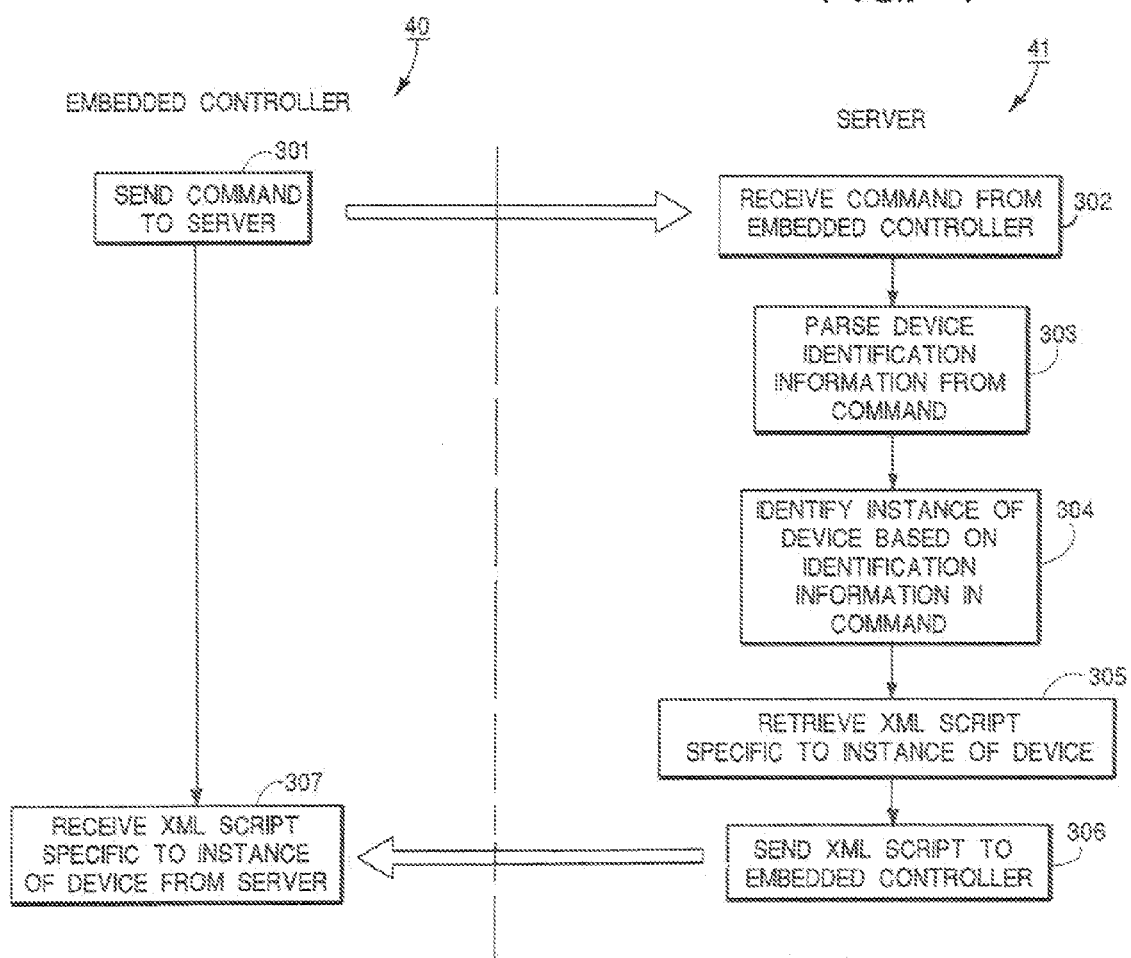

XML SCRIPTING OF SOAP COMMANDS

TECHNICAL FIELD

This invention relates generally to scripting simple object access protocol (SOAP) commands using extensible markup language (XML) and to providing the resulting XML script to a device for execution.

BACKGROUND

An apparatus may contain an embedded controller or agent software to monitor and control its operation. Any type of apparatus may have an embedded controller or agent including, but not limited to, home appliances, office equipment, medical devices, and industrial tools. Other examples include robots, blood analyzers, multifunction copiers, and air conditioners.

Embedded devices are often connected to an internal network, such as a local area network (LAN), with an interface to the Internet. Other devices on the internal network may communicate with an embedded device over the internal network. However, the embedded device is not generally addressable from the Internet. To address this problem, the embedded device may initiate communications with an addressable external device. That is, the embedded device may access the external device (e.g., a server) periodically to obtain necessary data.

SOAP is a standard for encoding function calls, such as remote procedure calls (RPCs), in XML. SOAP defines rules, i.e., a syntax, for encoding the function calls in XML. The body of a SOAP command is defined, at its start, by <SOAP-ENV:BODY> and, at its end, by </SOAP-ENV:BODY>. Code in between these two commands includes the function to be performed by the SOAP command. A SOAP command may include other data as well, such as header information.

SUMMARY

Heretofore, SOAP commands were only available as individual, discrete commands. This is impractical for device-initiated communication, particularly if the device is unaware of any timing issues relating to execution of the SOAP commands. The invention therefore scripts one or more SOAP commands in XML and provides the XML script to a device, such as an embedded controller, for execution. The XML script is executed by the embedded controller, much like a computer program, to control execution of the SOAP commands. For example, timing and sequence of execution of the SOAP commands may be specified in the XML script.

The invention also defines variables in the XML script, which may be passed to and from the SOAP commands. This facilitates the combination of SOAP commands in XML script and provides an advantage over the use of traditional SOAP commands, which are limited to passing "hard-coded" numerical values (i.e., non-variables).

In general, in one aspect, the invention is directed to a computer-implemented system for processing a simple object access protocol (SOAP) command. The system includes interpreting an XML script to perform a function contained in the XML script, the XML script containing the SOAP command, parsing the SOAP command from the XML script, and passing the SOAP command to a SOAP interpreter for execution. This aspect of the invention may include one or more of the following features.

Plural SOAP commands may be contained in the XML script. The plural SOAP commands may be passed to the SOAP interpreter. The plural SOAP commands may be executed in a sequence specified by the XML script. At least one of an argument and a return value may be received from the SOAP command following execution of the SOAP command. The argument may be stored as a variable in the XML script.

The XML script may declare a variable. A value of the variable may be passed as an argument to the SOAP command prior to executing the SOAP command. The function may be a conditional statement. The conditional statement may be an If-Then statement or an If-Then-Else statement. The function may be a control statement that affects a sequence of execution of the XML script and/or the SOAP command. The control statement may be a loop. The function may be an exception handler that affects a sequence of execution of the XML script and/or the SOAP command when an error condition exists. The function may be a statement that controls relative or absolute time to execute the SOAP command. Parsing may be performed by an XML interpreter and executing may be performed by the SOAP interpreter. The XML interpreter may pass the SOAP command to the SOAP interpreter and the SOAP interpreter may pass an output of the SOAP command to the XML interpreter.

In general, in another aspect, the invention is directed to a computer-implemented system for generating extensible markup language (XML) script that contains a simple object access protocol (SOAP) command. The system includes receiving code that defines a function and the SOAP command and translating the code to XML script that performs the function and contains the SOAP command. This aspect of the invention may include one or more of the following features.

The XML script may be provided to a device. The device may include a controller that executes the XML script. The code may contain plural SOAP commands and functions. The XML script may contain the plural SOAP commands and functions. The XML script may declare a variable. A value of the variable value may be passed as an argument to the SOAP command in the XML script.

The function may be a conditional statement. The conditional statement may be an If-Then statement or an If-Then-Else statement. The function may be a control statement that affects a sequence of execution of the XML script and/or the SOAP command. The control statement may be a loop. The function may be an exception handler that that affects a sequence of execution of the XML script and/or the SOAP command when an error condition exists. The function may be a statement that controls a relative or absolute time to execute the SOAP command.

Other features and advantages of the invention will become apparent from the following description, including the claims and drawings.

BRIEF DESCRIPTION OF THE DRAWINGS

FIG. 2 is a flowchart showing a process for translating human-readable code into XML script;

FIG. 3 is a flowchart showing a process by which the embedded controller retrieves XML script for the device from the server; and FIG. 4 is a flowchart showing a process by which the embedded controller executes the XML script.

DESCRIPTION

Figure 1:
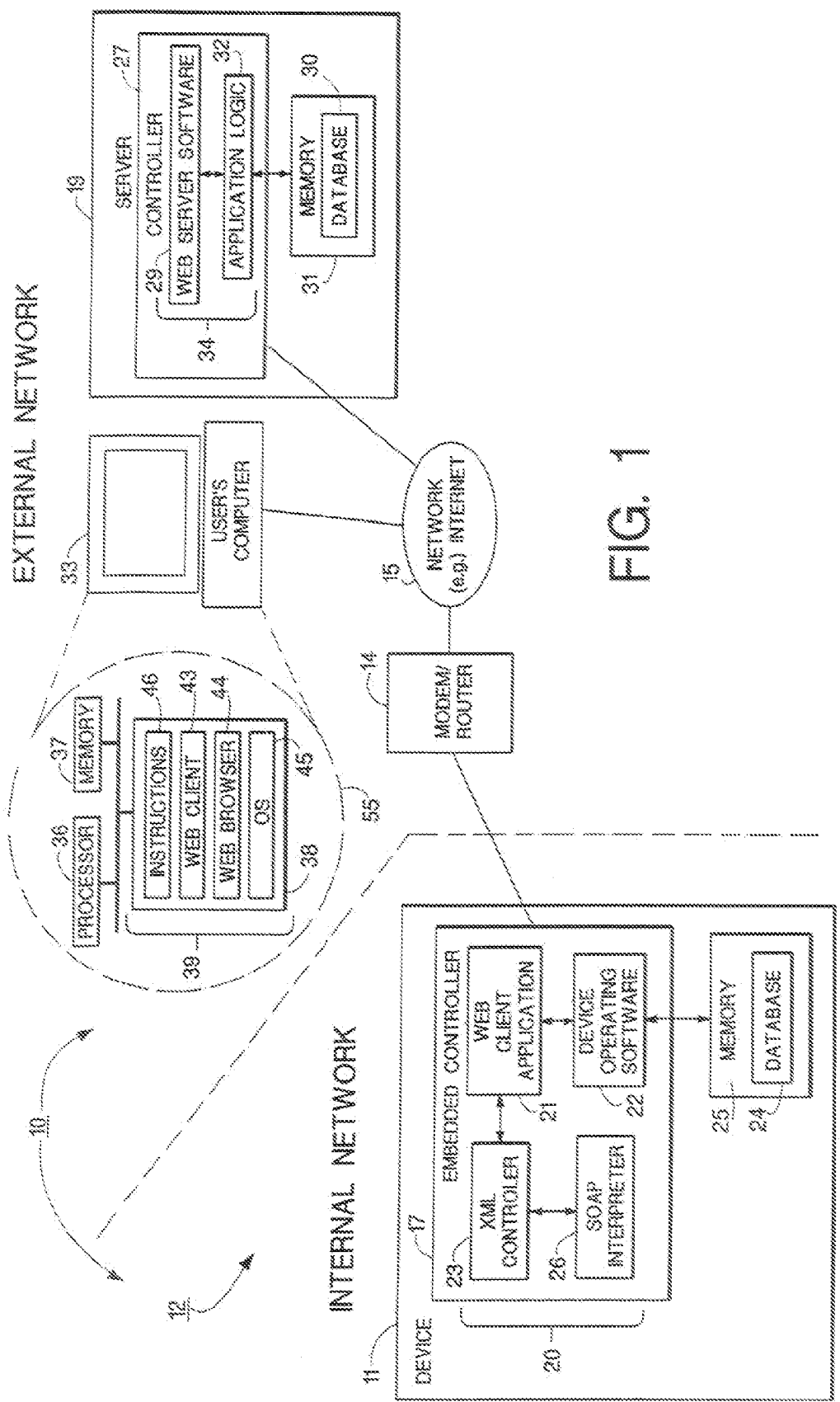
FIG. 1 is a block diagram of a network containing a server and a device having an embedded controller.

FIG. 1 shows a network 10. Network 10 includes a device 11 containing an embedded controller 17. Device 11 is any type of apparatus or system having functions that are monitored and controlled by embedded controller 17.

Device 11 is connected to an internal network 12, such as a LAN. A router or modem 14 couples internal network 12 to an external network 15, such as the Internet/World Wide Web (Web). External network 15 runs TCP/IP (Transmission Control Protocol/Internet Protocol) or some other suitable protocol. Network connections are via Ethernet, telephone line, wireless, or other transmission media.

External network 15 contains a server 19, which is a computer or any other processing device. Server 19 communicates with embedded controller 17 over external network 15 and internal network 12. Embedded controller 17 has a local IP (Internet Protocol) address that can be resolved within internal network 12. However, this local IP address may not be recognizable by devices on external network 15, such as server 19. As such, server 19 may not be able to directly address device 11.

Embedded Controller

Embedded controller 17 runs software 20, which includes Web client application 21 and operating software 22. Web client application 21 includes a TCP/IP protocol stack that allows embedded controller 17 to communicate over external network 15. Device operating software 22 provides an interface between Web client application 21 and a database 24 in memory 25. Through device operating software 22, embedded controller 17 retrieves data stored in database 24 and stores data in database 24.

Software 20 also includes an XML interpreter 23 and a SOAP interpreter 26. XML interpreter 23 is a module that receives XML script, parses the script, and performs the functions identified by the script. As background, XML is a self-describing computer language, meaning that fields in XML code identify variables and their values in the XML code. For example, a "data" field is delineated by "<data>" to indicate the start of the field and "</data>" to indicate the end of the field. XML is used because it can be generated, parsed and understood relatively easily.

Among the functions in the XML script may be an instruction to identify a SOAP command and to pass the SOAP command to SOAP interpreter 26 for processing. An example of another function includes a statement that controls relative or absolute time to execute the SOAP command. SOAP interpreter 26 receives SOAP commands from XML interpreter 23 and executes those commands. Examples of SOAP commands that can be executed by the embedded controller or agent include setting the value of a variable, uploading or downloading a file, restarting the software, or any action specific to the apparatus.

Database 24 stores data, such as operational parameters, XML script, and identification information for the instance of device 11. What is meant by "instance" is the specific identity of device 11 as distinguished from other identical devices. The identification information stored in database 24 identifies the instance of device 11. This identification information may include data identifying the type of the device, a common (or "friendly") name for the device, the manufacturer of the device, the model name of the device, the model number of the device, the serial number of the device, or a universal unique identifier (UUID) for the device.

The device type is the name of the device. The common name of the device is how the device is known in the vernacular, e.g., "television". The manufacturer identifies the manufacturer of the device, e.g., Sony®. The model name identifies the particular model of the device, e.g., Wega®. The model number identifies the model number of the device, e.g., XBR400®. The serial number identifies the serial number of a particular instance of the device, e.g., 53266D. The UUID is a universal identifier for the instance of the device, e.g., 4A89EA70-73B4-11d4-80DF-0050DAB7BAC5. Of the data shown above, generally only the serial number and the UUID are unique to the instance of device 11.

The identification data stored in database 24 is used by embedded controller 17 to retrieve XML script specific to the instance of device 11 (or for a particular type of device 11 ) from server 19. A device-initiated process for retrieving the XML script is described below.

Server

Server 19 is a computer that runs an HTTP (Hypertext Transfer Protocol) Web server computer program. Server 19 includes a controller 27, such as a microprocessor, for executing software to perform the functions described below. To avoid confusion in terminology, the following reads as though those functions are performed by server 19, even though software in controller 27 of server 19 performs the functions.

Server 19 executes Web server software 29 to communicate over external network 15. Web server software 29 also hosts a Web page associated with device 11. The Web page (not shown) is displayed on computer 33 of a user, such as the owner of device 11, who may select some actions to be sent to the device. For example, a remote operator may want to update three operational variables, which requires three SOAP commands. These three SOAP commands are wrapped in an XML script that executes the commands as a single operation. The XML script, along with any input updated operational parameters (if desired) are transmitted to Web server software 29 over external network 15. Web server software 29 stores the XML script in database 30 of memory 31. An example of a process for updating operational parameters is described in U.S. patent application Ser. No. 09/667,737, filed Sep. 22, 2000, the contents of which are incorporated into this application by reference as if set forth herein in full.

Web server software 29 stores and retrieves XML script from database 30 using application logic 32. Application logic 32 is software for accessing database 30 using Java servlets and a JDBC (Java Data Base Connectivity) database driver. The XML script can be stored in database 30 individually or as part of a configuration file for an instance of device 11.

Computer

Computer 33 is personal computer (PC) or other machine that includes a processor 36, a memory 37, and a storage medium 38 (see view 55 ). Storage medium 38 stores computer programs 39, which are executed by processor 36 out of memory 37. Computer programs 39 include a Web client application 43 containing a TCP/IP protocol stack for communicating over the Internet, a Web browser 44 such as Microsoft® Internet Explorer® for accessing Web pages, an operating system (OS) 45 such as Microsoft® Windows98®, and executable instructions 46 for implementing process 50, which is shown in FIG. 2.

Process 50 generates XML script containing one or more SOAP commands from user-generated code provided to computer 33. The code may be input by the user via a graphical user interface (GUI) (not shown), for example, or it may be retrieved from a storage medium or over network 15.

The code has a syntax that can be understood and interpreted by instructions 46. For example, the code may be a commonly-understood computer language, such as BASIC or "C", or a form of pseudo-code specific to the invention. The code defines functions, such as conditional statements (e.g., If-Then or If-Then-Else statements), control statements (e.g., do While or do Until loops), or exception handlers, meaning fail-safe mechanisms that are triggered in the code in the event that an instruction in the code fails. The functions affect the sequence of execution of the resulting XML code and/or SOAP commands.

An example of user-generated C/C++ code is set forth below:

```
int local = 8;
int total = 0;
while ( total < 10 )
{
    total = SomeFunction(total);
    AnotherFunction (local);
}
```

This code initializes integer variables "local" and "total" to values of "8" and "0" respectively. The code includes a "While" loop, meaning that the loop between the brackets "{}" is continually executed while the value of total is less than "10", whereafter processing within the loop is discontinued. Within the loop, the value of "total" is set equal to the result of a SOAP command called "SomeFunction" processing the previous value of "total" and another SOAP command called "AnotherFunction" processing "local".

Process 50 receives (201) code, such as that shown above, that defines one or more functions (e.g., a "While" loop) and one or more SOAP commands (e.g., "SomeFunction" and "AnotherFunction"). Process 50 translates (202) the code to XML script that, when interpreted, performs the functions and contains the SOAP commands. To perform the translation, process 50 may compile the code, interpret the functions in the compiled code, and generate appropriate XML script from the compiled code. An appropriate compiler may be included within instructions 46 for this purpose. The format of the SOAP commands may be static and known to the compiler, or the format may be determined dynamically from a WSDL (Web Services Description Language) document. WSDL is a standard for describing SOAP commands. WSDL is itself an XML document that can be interpreted automatically. WSDL defines the set of functions available and the format of each of the SOAP commands.

WSDL usually describes the functionality for a particular device or Web service. By reading WSDL, a program can display functions to a user, then create SOAP command(s) for the function(s) selected by the user. By way of example, there may be one thousand devices, all with individual settings, and it is desired to set all of the devices to 6% lower power usage. Using traditional SOAP commands, the server must be able to address each device, obtain each device's current setting, calculate 94% of its lo value, then write that new value back to each device, all through issuing individual SOAP commands. Using a SOAP script, the same script can be sent to all of the devices because the variable is evaluated locally at each device. As the population of monitored devices grows, this kind of distributed processing becomes more useful.

Continuing with the example set forth above, process 50 translates (202) the code into the following XML script:

```
<Root>
    <Variables>
        <local type ="integer"><8>/local>
        <total type ="integer"><0>/total>
    </Variables>
    <Script>
        <While condition="total < 10">
            <SOAP-ENV:Body>
                <SomeFunction>
                    <Count>total</Count>
                </SomeFunction>
            </SOAP-ENV:Body>
            <Return variable="total"/>
            <SOAP-ENV:Body>
                <AnotherFunction>
                    <Input>local</Input>
                </AnotherFunction>
            </SOAP-ENV:Body>
        </While>
    </Script>
</Root>
```

The XML script contains the same functions and SOAP commands as the original C/C++ code input by the user. For example, the "While" loop is expressed as <While condition="total<10"> and </While> and the SOAP commands are expressed as

```
<SOAP-ENV Body>
    <SomeFunction>
        <Count>total</Count>
    </SomeFunction>
</SOAP-ENV:Body>
```
and
```
<SOAP-ENV:Body>
    <AnotherFunction>
        <Input>local</Input>
    </AnotherFunction>
</SOAP-ENV:Body>
```

The expression "<Return variable="total"/>" returns the value of the variable "total" to the XML script. Thus, the output of the SOAP command may be passed back to the XML script as an argument in the SOAP command and used as a variable in the XML script. Also, the XML script may be written so that a variable, such as "total", is passed as an argument to a SOAP command.

An example of XML script containing a conditional "IF" statement is set forth in Appendix A attached hereto. An example of XML script containing an exception handler is set forth in Appendix B attached hereto.

After the code has been translated (202) to XML script, process 50 provides (203) the XML script to server 19 over network 15. Process 50 may send the XML script to server 19 through a Web interface, along with identification information that specifies the instance of device 11 for which the XML script is intended. Web server software 29 on server 19 receives the XML script over network 15 and application logic 32 stores the XML script in database 30, along with its associated identification information.

Device-Initiated Retrieval of the XML Script

Embedded controller 17 executes software 20 to retrieve the XML script intended for device 11 from remote server 19. In response, server 19 executes software 34 to send the XML script to embedded controller 17. FIG. 3 shows these processes in detail. The left half of FIG. 3, titled "Embedded Controller" shows process 40 performed by embedded controller 17, and the right half of FIG. 3, titled, "Server", shows process 41 performed by server 19.

Process 40 generates and sends (301) a command to server 19. The command, or a modified version thereof, is sent by embedded controller 17 to server 19 periodically. It is through this command that embedded controller 17 polls server 19 to determine if there is any new/updated XML script for device 11 on server 19.

The command includes XML data identifying device 11. The data identifies the specific instance of device 11 and may include a device type field and one or both of a device serial number field and a device UUID. The command may also include a common name field, a manufacturer name field, a model name field, and a model number field, which specify the information set forth above for the device.

The command may be either an HTTP GET command or an HTTP post command. The data included in those commands is similar, with the difference being that the HTTP GET command retrieves a document, such as a file containing the XML script, and the HTTP POST command retrieves information, such as the XML script itself.

Process 41 (in server 19) receives (302) the HTTP command from embedded controller 17. Process 41 identifies the command as either a POST or GET command based on a header, such as "POST/CONTROL HTTP/1.1" (for a POST command), in the command. Process 41 uses an XML parser to parse (303) the various identifying fields, such as device type, serial number, and UUID, from the command.

Process 41 identifies (304) the instance of device 11 based on the information parsed from the command. That is, process 41 uses the device type, serial number, and UUID field information to identify the instance of device 11.

If the Command is a POST Command

The identification information from the command, in particular the device serial number and/or UUID, is used to search through database 30 for XML script specific to device 11. Once the appropriate XML script has been identified (304), process 41 retrieves (305) that XML script from database 30 using application logic 32. Process 41 determines if the XML script has been updated since it was last retrieved. This may be done by examining a revision number or date included in a header associated with the XML script. If the XML script has been updated, process 41 adds the updated XML script to the reply portion of POST command and sends (306) the POST command, with the updated XML script, back to embedded controller 17.

If the Command is a GET Command

As was the case above with the POST command, the identification information from the command is used to search through database 30 for XML script for the specific instance of device 11. In particular, the device serial number and/or UUID are used to retrieve (305) a configuration file that is specific to device 11. The configuration file contains the XML script for device 11. Process 41 sends (306) the configuration file to embedded controller 17.

Process 40 receives (307) the XML script containing one or more SOAP commands from server 19 in response to the HTTP command. Process 40 (in particular Web client application 21 in device 11) provides the XML script to XML interpreter 23, where the XML script is executed.

Referring to FIG. 4, a process 52 is shown for executing the XML script in embedded controller 17. Process 52 is implemented by executable instructions in XML interpreter 23 and SOAP interpreter 26.

XML interpreter 23 interprets (401) the XML script to perform the functions contained therein. For example, if there are any conditional statements, control statements, or exception handlers defined by the XML script, XML interpreter performs those functions on the appropriate commands and variables contained in the XML script.

During processing, XML interpreter 23 parses (402) the XML script to identify any SOAP commands contained in the XML script. Identified SOAP commands are passed to SOAP interpreter 26, which executes (403) the SOAP commands. Results of the SOAP commands may be passed back to the XML interpreter 23 for further processing. Likewise, variables may be passed from the XML script to the SOAP commands.

Using XML script in this manner, embedded controller 17 is able to execute multiple SOAP commands in response to a single device-initiated query. Thus, device 11 can perform reconfiguration operations or the like using multiple SOAP commands without maintaining communication with an external device, such as server 19, during the reconfiguration process. The XML script can specify (future) times at which the SOAP commands are to be executed, thus providing the device with further control over its own operation. SOAP interpreter 26 implements the SOAP standard to interpret and execute function calls. As more devices and software systems have support for SOAP, device 11 will be able to execute a script that controls multiple devices by calling their SOAP services.

Architecture

Processes 40, 41, 50 and 52 are not limited to use with the hardware/software configuration of FIG. 1; they may find applicability in any computing or processing environment. Processes 40, 41, 50 and 52 may be implemented in hardware (e.g., an ASIC {Application-Specific Integrated Circuit} and/or an FPGA {Field Programmable Gate Array}), software, or a combination of hardware and software.

Processes 40, 41, 50 and 52 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 40, 41, 50 and 52.

Processes 40, 41, 50 and 52 may also be implemented as an article of manufacture, such as one or more machine-readable storage media (e.g., compact or floppy disc), each configured with a computer program, where, upon execution, instructions in the computer program cause a machine (e.g., a computer) to operate in accordance with one or more of processes 40, 41, 50 and 52.

The invention is not limited to use with the protocols and standards described above. For example, Web server may use Java Servlets, ASP (Active Server Pages), ISAPI (Internet Server Application Programming Interface), or .NET interfaces to communicate with application logic 32. The HTTP commands sent by embedded controller 17 and/or server 19 are not limited to HTTP GET and POST commands. Any commands and/or requests for requesting and receiving data may be used.

The invention is not limited to the protocols and architecture described with respect to FIG. 1. Similarly, the invention is not limited to device-initiated transfers of the XML script. For example, computer 33 may transmit the XML script directly to embedded controller 17 (rather than by way of server 19) via e-mail, file transfer protocol (FTP), message queues, or any other type of data transfer mechanism. These other transfer protocols may also be used with device-initiated transfers. Server 19 may generate the XML script and transmit it directly to controller 17. The XML script may be used on any machine, and is not limited to use with embedded controllers. RPCs other than SOAP calls may be scripted using XML and the resulting XML script may be processed in the manner described herein. SOAP commands other than those described herein may be used. The processes described herein may be implemented using circuitry such as programmable logic, logic gates, a processor, and/or a memory.

Other embodiments not specifically described herein are also within the scope of the following claims.

What is claimed is:

1. A method, performed by a device, for processing plural simple object access protocol (SOAP) commands, comprising:
outputting a single device-initiated query to a server;
receiving eXtensible Markup Language (XML) script from the server in response to the single device-initiated query, the XML script containing the plural SOAP commands, the XML script defining a process for executing a first SOAP command, receiving a first value in response to execution of the first SOAP command, executing a second SOAP command, and receiving a second value in response to the second SOAP command; and
executing the process on the device without communicating with the server during execution of the process, wherein executing the process comprises:
interpreting the XML the script to perform a function contained in the XML script;
parsing the first SOAP command from the XML script;
passing the first SOAP command to a SOAP interpreter for execution;
receiving the first value in response to execution of the first SOAP command;
parsing the second SOAP command from the XML script;
passing the second SOAP command to the SOAP interpreter for execution; and
receiving the second value in response to execution of the first SOAP command.

2. The method of claim 1, further comprising:
storing at least one of the first and second values as a variable in the XML script.

3. The method of claim 1, wherein:
the XML script declares a variable; and
a value of the variable is passed as an argument to at least one of the first and second SOAP commands prior to execution thereof.

4. The method of claim 1, wherein the function comprises a conditional statement.

5. The method of claim 4, wherein the conditional statement comprises an If-Then statement or an If-Then-Else statement.

6. The method of claim 1, wherein the function comprises a control statement that affects a sequence of execution of the XML script, the first SOAP command, and/or the second SOAP command.

7. The method of claim 6, wherein the control statement comprises a loop.

8. The method of claim 1, wherein the function comprises an exception handler that affects a sequence of execution of the XML script, the first SOAP command, and/or the second SOAP command when an error condition exists.

9. The method of claim 1, wherein the function comprises a statement that controls relative or absolute time to execute the first and/or second SOAP commands.

10. The method of claim 1, wherein parsing is performed by an XML interpreter, the XML interpreter passing the first and second SOAP commands to the SOAP interpreter and the SOAP interpreter passing the first and second values, respectively, back to the XML interpreter.

11. An article comprising one or more machine-readable media that store executable instructions for processing plural simple object access protocol (SOAP) commands, the instructions for causing one or more machines comprising at least one device to:
output a single device-initiated query to a server;
receive eXtensible Markup Language (XML) script from the server in response to the single device-initiated query, the XML script containing the plural SOAP commands, the XML script defining a process for executing a first SOAP command, receiving a first value in response to execution of the first SOAP command, executing a second SOAP command, and receiving a second value in response to the second SOAP command; and
execute the process on the device without communicating with the server during execution of the process, wherein executing the process comprises:
interpreting the XML script to perform a function contained in the XML script;
parsing the first SOAP command from the XML script;
passing the first SOAP command to a SOAP interpreter for execution;
receiving the first value in response to execution of the first SOAP command;
parsing the second SOAP command from the XML script;
passing the second SOAP command to the SOAP interpreter for execution; and
receiving the second value in response to execution of the first SOAP command.

12. The article of claim 11, further comprising instructions that cause the one or more machines to:
store at least one of the first and second values as a variable in the XML script.

13. The article of claim 11, wherein:
the XML script declares a variable; and
a value of the variable is passed as an argument to at least one of the first and second SOAP commands prior to execution thereof.

14. The article of claim 11, wherein the function comprises a conditional statement.

15. The article of claim 14, wherein the conditional statement comprises an If-Then statement or an If-Then-Else statement.

16. The article of claim 11, wherein the function comprises a control statement that affects a sequence of execution of the XML script, the first SOAP command, and/or the second SOAP command.

17. The article of claim 16, wherein the control statement comprises a loop.

18. The article of claim 11, wherein the function comprises an exception handler that affects a sequence of execution of the XML script, the first SOAP command, and/or the second SOAP command when an error condition exists.

19. The article of claim 11, wherein the function comprises a statement that controls relative or absolute time to execute the first and/or second SOAP commands.

20. The article of claim 11, wherein parsing is performed by an XML interpreter, the XML interpreter passing the first and second SOAP commands to the SOAP interpreter and the SOAP interpreter passing the first and second values, respectively, back to the XML interpreter.

21. A device for processing plural simple, object access protocol (SOAP) commands the apparatus comprising circuitry to:
output a single device-initiated query to a server;
receive eXtensible Markup Language (XML) script from the server in response to the single device-initiated query, the XML script containing the plural SOAP commands, the XML script defining a process for executing a first SOAP command, receiving a first value in response to execution of the first SOAP command, executing a second SOAP command, and receiving a second value in response to the second SOAP command; and
execute the process on the device without communicating with the server during execution of the process, wherein executing the process comprises:
interpreting the XML script to perform a function contained in the XML script;
parsing the first SOAP command from the XML script;
passing the first SOAP command to a SOAP interpreter for execution;
receiving the first value in response to execution of the first SOAP command;
parsing the second SOAP command from the XML script;
passing the second SOAP command to the SOAP interpreter for execution; and
receiving the second value in response to execution of the first SOAP command.

22. The device of claim 21, further comprising circuitry to:
store at least one of the first and second values as a variable in the XML script.

23. The device of claim 21, wherein:
the XML script declares a variable; and
a value of the variable is passed as an argument to at least one of the first and second SOAP commands prior to execution thereof.

24. The device of claim 21, wherein the function comprises a conditional statement.

25. The device of claim 24, wherein the conditional statement comprises an If-Then statement or an If-Then-Else statement.

26. The device of claim 21, wherein the function comprises a control statement that affects a sequence of execution of the XML script, the first SOAP command, and/or the second SOAP command.

27. The device of claim 26, wherein the control statement comprises a loop.

28. The device of claim 21, wherein the function comprises an exception handler that affects a sequence of execution of the XML script, the first SOAP command, and/or the second SOAP command when an error condition exists.

29. The device of claim 21, wherein the function comprises a statement that controls relative or absolute time to execute the first and/or second SOAP commands.

30. The device of claim 21, wherein parsing is performed by an XML interpreter, the XML interpreter passing the first and second SOAP commands to the SOAP interpreter and the SOAP interpreter passing the first and second values, respectively, back to the XML interpreter.

31. The device of claim 21, wherein the circuitry comprises at least one of programmable logic, logic gates, a processor, and a memory.

* * * * *

UNITED STATES PATENT AND TRADEMARK OFFICE
CERTIFICATE OF CORRECTION

PATENT NO. : 7,178,149 B2  Page 1 of 1
APPLICATION NO. : 10/123960
DATED : February 13, 2007
INVENTOR(S) : James R. Hansen It is certified that error appears in the above-identified patent and that said Letters Patent is hereby corrected as shown below:

Column 9, Claim 1, Line 57;
Insert --second-- and delete "first" before "SOAP"

Column 10, Claim 11, Line 53;
Insert --second-- and delete "first" before "SOAP"

Column 12, Claim 21, Line 4;
Insert --second-- and delete "first" before "SOAP"

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,178,149 B2  Page 1 of 1
APPLICATION NO. : 10/123960
DATED : February 13, 2007
INVENTOR(S) : James R. Hansen It is certified that error appears in the above-identified patent and that said Letters Patent is hereby corrected as shown below:

Column 9, Claim 1, Line 57;
Insert --second-- and delete "first" before "SOAP"

Column 10, Claim 11, Line 53;
Insert --second-- and delete "first" before "SOAP"

Column 12, Claim 21, Line 4;
Insert --second-- and delete "first" before "SOAP"

Signed and Sealed this

Eighth Day of April, 2008

JON W. DUDAS
*Director of the United States Patent and Trademark Office*